E. LESCHBRANDT.
PHOTOGRAPHIC CAMERA.
APPLICATION FILED MAY 29, 1915.
1,284,379.
Patented Nov. 12, 1918.
2 SHEETS—SHEET 1.
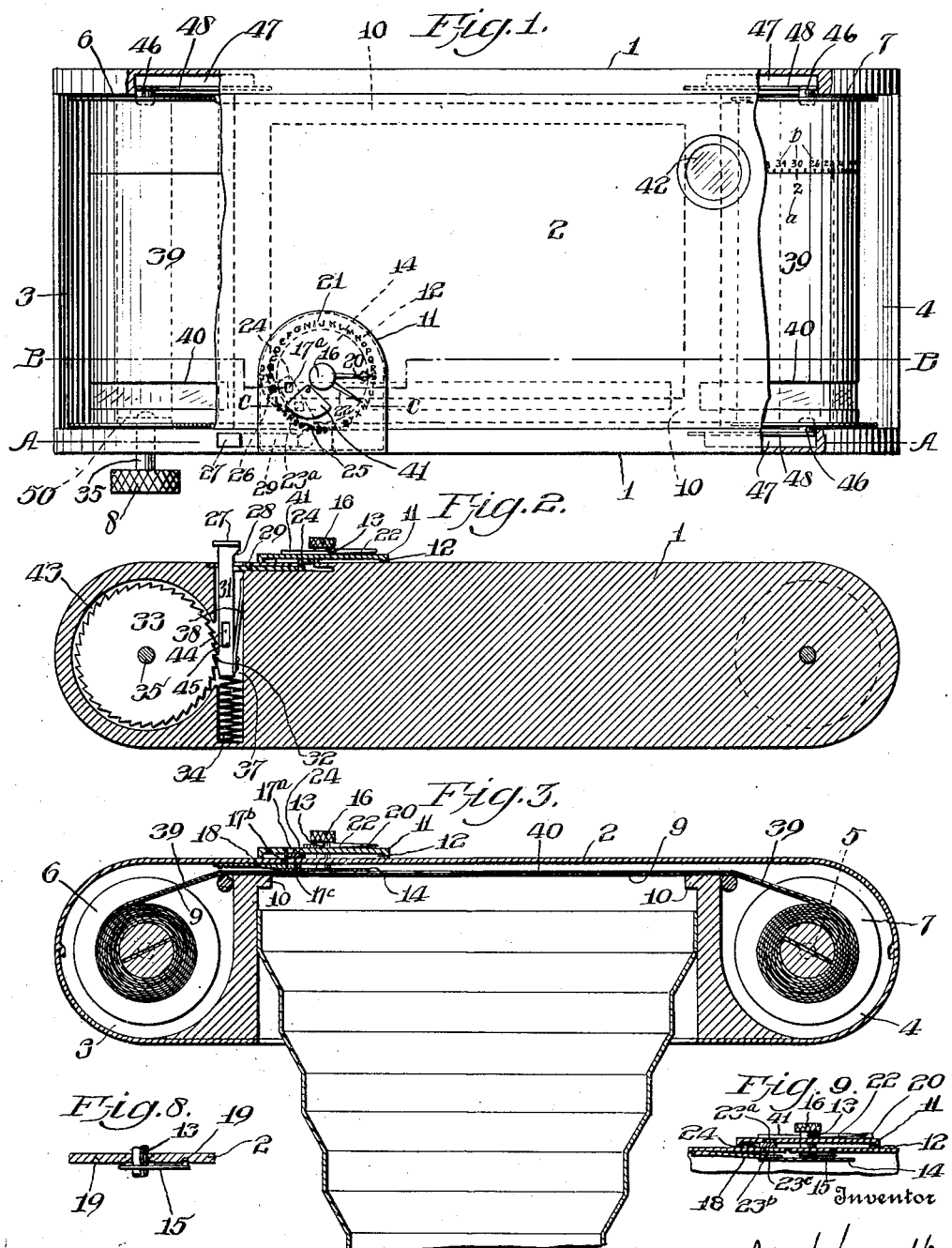

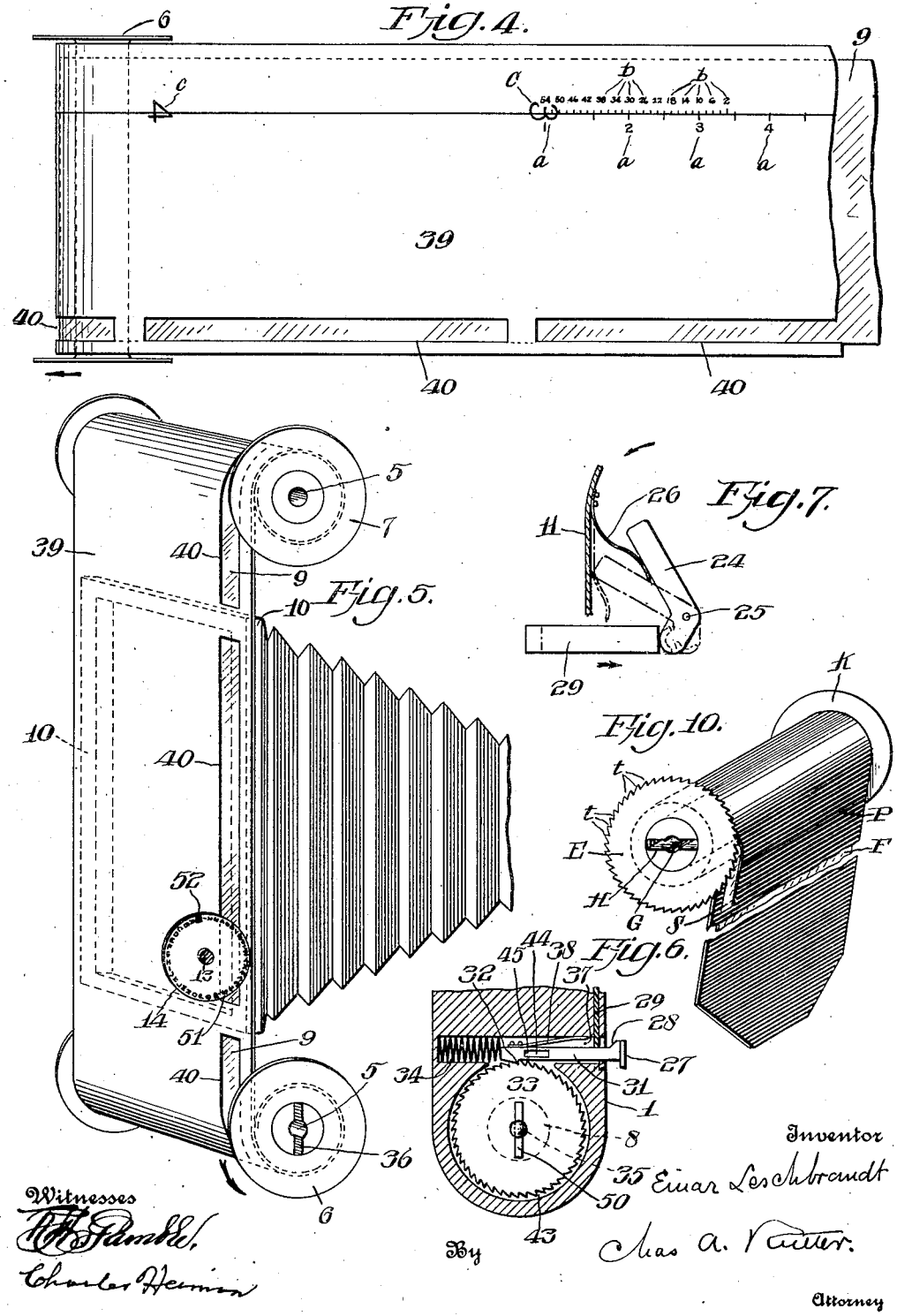

UNITED STATES PATENT OFFICE.

EINAR LESCHBRANDT, OF PHILADELPHIA, PENNSYLVANIA.

PHOTOGRAPHIC CAMERA.

1,284,379.  Specification of Letters Patent.  Patented Nov. 12, 1918.

Application filed May 29, 1915. Serial No. 31,185.

*To all whom it may concern:*

Be it known that I, EINAR LESCHBRANDT, a resident of the city of Philadelphia, county of Philadelphia, State of Pennsylvania, have invented certain new and useful Improvements in Photographic Cameras, of which the following is a specification.

My invention relates to improvements in photographic cameras, and the object thereof is to furnish a means whereby a person may print upon the photographic film contained in the camera a title or inscription in type, and produce such printed words properly alined and spaced as well as suitably located on the film in order that the final and finished print may bear an appropriate title, nicely typed, and so arranged that the whole will present a pleasing apearance.

To accomplish this object I prefer to print the title by means of photographic exposure, and directly upon the light sensitive sheet in the camera while it is in position opposite the camera lens, and, in so carrying out my invention, I use a flexible photographic film to receive the pictorial impression or view as well as the inscription, and accomplish further objects by the utilization of a spool or roller upon which such films are usually wound, as a means, not only to advance the film before the lens to get a series of pictures as is customary, but also for moving the film in the particular manner required in order to print thereon a title, letter by letter, as will hereinafter be described, and to dispose of the film before and after the printing of letters in such a manner, and to the end, that the addition of the printing device to the camera shall not require an increase in its size, and only a minimum increase in cost of manufacture.

My invention is illustrated in the accompanying drawings in which similar numerals of reference indicate similar parts throughout the several views, and in which:—

Figure 1, is a rear elevation of a camera embodying my improvements and having the back partly broken away to show the spools:

Fig. 2, a section on line A—A of Fig. 1:

Fig. 3, a section on line B—B of Fig. 1:

Fig. 4, a plan of part of film and light-proof paper backing adapted for use in my camera:

Fig. 5, a diagrammatic view showing the exposure frame and letter carrying disk in their relative positions, also the film and paper with openings therein and the relative position of these to the frame and disk:

Fig. 6, a broken sectional view of that end of the camera that is opposite to the spool 6, and showing the inner face of the ratchet wheel and means whereby the spool is attached to the shaft carrying same:

Fig. 7, an enlarged detail view of the shutter otherwise shown in Figs. 1, 2 and 3:

Fig. 8, a fragmentary view to show the spring detent on shaft 13:

Fig. 9, a section on line C—C of Fig. 1:

Fig. 10, a modification of the manner of carrying the ratchet wheel.

Referring to Fig. 1: 1 are the sides, and 2 the back of the camera case. Within the camera, and in the two end compartments 3—4, Figs. 1 and 3, are the spools or rollers 6 and 7. The spool 7, as shown in Fig. 1, is rotatably mounted on the studs 46 on the springs 48 placed in the recesses 47, and these studs enter the hollow centers 5 of the spool. The springs 48 are pressed outward as the spool is pushed in or pulled out of engagement with the studs 46, thus permitting its insertion or removal. For the spool 6 a similar arrangement is provided for one of its ends but the other end of this spool is adapted to connect with the shaft 35, which is suitably journaled through the side of the camera, and carries a knob 8 by means of which the spool can be rotated by hand.

The spools 6 and 7 carry in the form of a tape or band, a flexible light sensitive film 9, best seen perhaps in Fig. 3, and the spools serve to wind the film, that is to say, rolling it up or unrolling it. For instance, as the spool 6 is rotated, the film will be rolled up on this spool and unrolled from spool 7. The path of travel of the film is over the exposure frame 10, so that, by rotating the spool 6, the film can be moved over same in order that successive parts of the film may be positioned before the exposure frame to place, each time, a fresh, unexposed surface before the lens of the camera.

The camera back 2, carries a metal case 11, near one side, and the case forms, together with the back, a compartment 12. Through the center of the case 11 extends the shaft 13 furnished with a knurled knob 16 for turning the shaft 13 by hand. At its lower end, and on the inner side of back 2, the shaft carries a disk 14, of celluloid, or other transparent material. This disk is best seen in Fig. 5, and carries upon it, concentrical with the shaft, a circle of permanent letters, figures and other characters, these being adapted to be photographically printed on the film 9 by the admission of light upon them. For this purpose the characters are either opaque on transparent ground or transparent on opaque or non-actinic ground, being, in either case, light pervious patterns. In the back 2, Fig. 3, and over the circle of letters on the disk 14, is a light pervious opening or aperture, 17$^b$, of such size and shape that only one character on the disk can be placed in register with it at one time. Each character can be brought into register with the same opening by turning the knob 16. In the case 11, and directly above the opening 17$^b$, is a similar opening 17$^a$. The flat spring 18, the purpose of which is to press the flexible celluloid disk 14 against the film 9 in order that the printed letters may be as sharp as possible, carries at its free end a similar opening 17$^c$. These three openings lie directly one above the other and, serving the same purpose of admitting light to the film below them, I make no distinction between the one single opening, that is functionally necessary, and several,—a plurality being mainly for facility of construction. I shall, therefore, in the claims, regard the three as one, and shall in this specification, at times, refer to them as one opening or aperture, using the numeral 17 in reference thereto.

However, it is desirable that the point of entrance of the light into the device shall, as shown, be a sensible distance away from the letter, and that the entrance shall be sufficiently contracted relatively to the size of a letter, because, by this provision, light rays, which are very oblique to the plane of the film, are cut off, while those more nearly perpendicular are admitted, the effect being to sharpen the printed letters.

Fig. 8, which is a fragmentary sectional view, shows in enlarged detail a spring detent 15, carried by shaft 13 in order to facilitate the accurate placing of the characters in register with the opening. In the underside of the back 2, and concentrical with shaft 13, is a circle of small indentations, one for each character on the disk 14, and the spring 15 carries at its free end a point which is pressed into these indentations 19, and thereby tending to stop the shaft 13 in the several positions.

The shaft 13 carries a pointer 20, which when pointing to a certain letter on the circle of characters 21, carried upon the case 11, indicates that a similar letter on the disk 14 is in register with the opening 17.

The shaft 13 also carries a second pointer 22, and the case another opening 23$^a$ which serves a similar object to that described, but will be more fully explained farther on.

In the compartment 12 is the shutter 24, adapted to close off the opening 17. It is in the form of a lever which swings on the pivot 25, carried by the case 11 and the back 2. This shutter is seen in enlarged detail in Fig. 7, showing its two positions. The long arm of the lever swings sidewise to the left between the openings 17$^a$ and 17$^b$, thus permitting light to enter to the film, and a spring 26 swings it to close it back again, thus keeping the opening 17 closed to the light. The shutter is actuated by the push-button 27 situated in the side of the camera and which carries for this purpose, as part of the strip 31, a wedge 28 adapted to engage one end of the freely sliding metal strip 29, the latter being placed in a suitable groove, or recess, in the camera side. When the push-button is pressed down, the wedge will slide the strip 29 and the latter will push against the small arm of the shutter lever 24, thus operating the latter.

The push-button 27 carries a metal strip 31, located in the hole 37 in the camera side and suitably guided therein so that it can move up and down to actuate the ratchet wheel 33, and also have some free motion sidewise in order that the tooth or projection 32, formed on one edge of the strip 31, may slide over, as well as engage with, the teeth on the ratchet wheel to operate same. The spring 38 pushes the tooth or projection 32 in engagement with the teeth on the ratchet wheel, and the coil spring 34 serves to push the strip 31 up, the latter thus acting as a pawl to rotate the ratchet wheel. The stationary pin 45 passes across the hole 37 in the camera side and through the slot 44 in the strip or pawl 31 and acts as a stop for the up and down movement of the strip in order to appropriately limit the rotation of the ratchet wheel 33, and to prevent the pawl from passing over more than one tooth as it moves downward. The ratchet wheel 33, which is situated in the circular recess 43 in the camera side, rotates with the shaft 35, and the inner end of the latter enters the hollow center 5 of the spool 6 and carries a transversely mounted pin 50 which enters the slot 36 in the spool to lock them together, all to the purpose that when shaft 35 is rotated, either by means of the knob 8, or by the ratchet wheel 33 when the push-button 27 is depressed and released, the spool 6 will be rotated.

By reference to Fig. 2, it will be seen that the various parts are so arranged that the ratchet wheel and the shutter 24 are actuated by the same push button, but in such a manner that the ratchet wheel is not rotated while the aperture 17 is opened by the shutter. This is for the purpose that the film shall remain at rest during the exposure of a letter, and that the film movement, the object of which is to space the letters printed on the film, shall take place either before or after each exposure. It will be seen that when the push-button is depressed the pawl will pass idly over a tooth and pass it to the extent of part of the next tooth, but not far enough to pass over the latter, and that the wedge 28 will not engage the strip 29, until the button has been pushed so far down that the tooth 32 on the pawl is past the ratchet wheel tooth it is to engage,— the additional movement past this position serving to actuate the shutter. Upon release of the push-button the shutter will again have closed the aperture when the pawl has come up so far as to engage the ratchet tooth,—consequently the aperture is closed before the film commences to move.

When the film is moved successive steps through the actuation of the push-button, the length of each step bears a certain relation to the size of characters used, particularly the width or lateral dimension, the ratchet-teeth being spaced in accordance therewith and with regard to an average diameter of the film roll or cartridge. In other words, the smaller the characters are, generally speaking, the greater is the number of teeth on the ratchet, and therefore the smaller the steps, so that characters successively printed on the film will neither overlap nor be separated more than what is suitable for the formation of words with characters of the size employed.

From the foregoing it will be seen that I have provided for the film two manners of movement over the exposure frame of the camera, one, a free movement, by which I mean that there is no other impediment than friction, and so adapted that the film may be readily advanced to place it in the several positions along its length before the exposure frame appropriately for its being impressed with a series of photographic views through the regular lens of the camera; the other, a step by step movement, and appropriate for spacing the letters printed on the film to form them into words constituting titles to the views thus taken.

In a word-printing device of the kind herein shown, combined as it is with a camera adapted for view exposure, it is important that the spacing mechanism in communicating from the exterior to the interior of the camera shall not, on account of such communication, prevent the exclusion of actinic light from the film chamber or camera interior, as in this type of camera highly sensitized film is mostly employed, from which actinic light must be normally entirely excluded so as to prevent its fogging or spoilation. This feature of my invention has been duly carried out, as will have been understood from the foregoing description, and more will be pointed out in this specification, or in the claims.

Rolls of film are generally furnished with a backing strip of opaque paper 39, Fig. 4, but in order to print inscriptions on the film from the rear, it is necessary to provide means whereby the access is obtained to the film while yet retaining the paper backing as a cover to shield the main parts of the film, and to carry the exposure numerals. To this end I place openings or slots 40 in the paper at suitable and equal distance apart, and so placed that when the film and paper is moved over the exposure frame by the rotation of the spools, the openings or windows 40 pass beneath the letter printing apertures in the camera.

In order that the successive printing of letters during the forming of words on part of the film shall not by successive exposures spoil the main film portion, particularly the area opposed to the exposure frame opening, the letter-printing device is arranged so that, while the casing including the usual bellows at the front incloses the film, the film is during the printing of letters through either one of the apertures affected only along a portion situated near a longitudinal film edge, whereby, as the picture area travels during the spacing movements of the film, its main part does not run in on the path along which the printing is done. It is obvious that the part of the film affected or exposed in the printing of letters may vary somewhat in extent, depending on a number of things, for instance, the size of letters, size of aperture, or, when the patterns are light pervious, on whether the ground is transparent or opaque. If opaque the exposed area is likely to be smaller than if transparent, but, in either case, the main film portions will be shielded, particularly the area opposed to the frame opening, or, when the title is printed within the picture, at least the larger part of such area.

As previously stated, the shaft 13 carries a pointer 22 and the case 11 an opening 23$^a$. The pointer and opening are so placed with reference to each other that, when the pointer 22 points to a certain character on the case 11, a similar character on the disk 14 is below the aperture 23$^a$. As seen in Fig. 9, which is a section on line C—C of Fig. 1, the opening 23$^a$ is over a similar one 23$^b$ in the back 2, and the spring 18 has likewise another, 23$^c$. These openings are for the purpose of admitting light to the film in order to print thereon the character on disk 14 brought into register with them, the shutter 24 acting to open and close these apertures as it does in the case of the main exposure opening 17. As in the case of the openings 17ª, 17ᵇ and 17ᶜ, I shall, and for the same reason, regard the openings 23ª, 23ᵇ and 23ᶜ as one opening, using the reference numeral 23 to indicate same.

Now the object of having a main exposure aperture 17, and an auxiliary one 23, is that the former, being over a corner of the exposure frame, will print the title on the foreground of the picture, while the latter, by being placed exterior to the area formed by the inner sides or edges of the exposure frame, will print outside the picture, namely along the unexposed margin, or edge, of the film. This relative arrangement of the exposure apertures enables an operator to place a title, which is appropriate to the picture, on the foreground of the latter, and to place such other inscription, which he does not wish to appear in the picture, such as a record of exposure for instance, along the unused margin of the film. It is necessary, of course, that the opening 17 shall be kept closed when the opening 23 is used for printing purpose, or vice versa, and for this reason I place on the case 11, as shown in Fig. 1, a pivotally turned shutter 41 adapted to slide over and close either opening, or both, if desired.

Fig. 1 shows the main exposure opening 17 so located on the back 2 that it is over the film near one of its longitudinal edges. By thus locating the opening the combined camera and word-printing device will have a minimum of working parts, compactness as to the arrangement of its several operative parts and be convenient to manipulate.

It will be understood that the main exposure opening 17 may be placed anywhere along the path of travel of the film, but beside the advantage of the above mentioned position there are further advantages obtained by locating it over one of the corners of the exposure frame of the camera, particularly the corner which corresponds to the lower left hand corner of the finished photographic view taken by the camera. When the opening is thus located the first letter of the title will come in a position near the left hand corner of the picture, and this leaves the largest possible space to the right for the subsequent letters of the title, and by the corresponding location of the light pervious opening in the camera I accomplish three purposes; first, in the case of a short title such title will have a position on the picture agreeable to the eye and without appearing dissymmetrically placed; second, the title can be added to without the added length making the whole title appear improperly placed; third, it will, at the same time, permit of a title long enough to extend across the picture. The diagrammatic view Fig. 5 helps to illustrate this preferable position by showing the position relative to the exposure frame of the camera a character on the disk 14 will occupy when such character is placed in register with the main exposure aperture above it, and the aperture is located as stated. Here the character "S" (also indicated by the reference numeral 51) is the one assumed to be in register with the opening 17 of Fig. 1. By using the designation "exposure frame" in this specification and in the claims, I mean to denote the frame 10 in Figs. 1, 3 and 5, or equivalent arrangement for forming the opening before which the film is placed in taking the photographic view. This frame, in conjunction with the regular lens or objective of the camera, defines the pictures, the frame defining the boundary or edges of the picture or view during exposure by suitably masking a portion of the film. It will be understood that such frame, or opening forming means, in order to serve the herein described purpose, need not necessarily be built in the main body of the camera, for it may be arranged to be part of a container for the light sensitive sheet, and as such, a detachable part of the camera; and in either case, by designating the location of the title-printing aperture as being over a corner of the frame, I do not only mean the frame itself, or the opening formed by it, but also the photographic area exposed to the lens through the frame opening, for, by having the aperture 17 located some distance to the left or the right of the position shown in the drawings, and by correspondingly adjusting the film before beginning to print a title, the same relation of position is maintained, and I regard these variations as being according to my invention.

While the above mentioned location of the title printing opening is advantageous for general use, I contemplate that the operator may, at times, desire to place a word upon the film in another location, for instance a central position at the bottom of the picture, or below a person or object appearing in the picture and in order to name or identify same from other persons or objects. To facilitate this I place upon the opaque paper backing 39, a series of figures and graduations as shown in Fig. 4.

I may here state that the paper which shields the film need not necessarily have a slot or window bounded by four edges, but may have any suitable form of cut or opening, or any other provision or arrangement whereby the paper does not cover or obscure the film with respect to light from the letter printing aperture when a title is printed.

The scale with the smaller figures, indicated by b, b, in Fig. 4, may, by being observed through the red glass 42 of Fig. 1, facilitate adjusting the film for printing the title centrally between the left and right hand end of the view, at the bottom. For instance, the figure 18 is so placed on the paper backing 39, which forms the shield or cover to the film, that when the spool 6 is rotated by the knob 8 and the above mentioned figure 18 is brought centrally before the red glass, the film is thereby so adjusted before the letter printing opening that, when a title comprising 18 characters is now printed, it will have a central position along the length of the view. The other figures in same row similarly indicate the adjustment of the film for a title of different numbers of characters.

If it is desired to adjust the film one or more individual spacing steps not numerically indicated by the figures $b, b$, the latter may be ignored and the smaller graduation marks between the figures $a, a$, be sighted for adjustment under a particular spot in the glass 42, or at the edge of the glass, these marks being spaced apart according to the size of the patterns or characters on disk 14 so as to denote the proper steps of feed for the film for spacing the letters of a word, the proper adjustments for this being further facilitated by the fact that the pawl 31 coöperates with the ratchet-wheel in the manner of a detent when the knob 8 is being turned.

The largest figures on the paper cover 39, namely 3, 4, and indicated by the reference letters $c, c$, are the customary ones denoting the number of view exposed. The camera may carry the usual means (not shown) of holding the film taut over the exposure frame.

When I use the expression "winding" and "longitudinal edge" in reference to the light sensitive film or sheet of the camera, I mean by the former a manner of progressively bending the film during its being moved to dispose of it and place it in layers, in which case the "longitudinal edge" of the film is an edge thereof which is parallel with the direction in which the film is moved. Similar expressions used with reference to the flexible protective sheet or backing moving with the film would have similar meaning. And, again, the upper edge and the lower edge of the strip of film 9, when viewed as seen in Fig. 4, would be the "longitudinal" edges of the strip.

I may here remark that in the place of the ratchet wheel 33, one of the flanges of the spool 6 may be utilized as such by having the teeth along its periphery, the distance between the teeth in either case being such that the film will be advanced a sufficient step, for each tooth engaged, to cause a suitable space between the printed letters. When the ratchet wheel is part of the spool, the pawl, in order to engage same for rotation, merely requires to be extended into the chamber 3 in any suitable manner.

This modified manner of carrying the ratchet wheel is shown in Fig. 10 which illustrates a spool having one of its flanges E provided with teeth $t, t$, K being the opposite flange, G the hollow center, H the slot for engagement with the pin 50 on shaft 35, F the film and P the paper backing, both being wound on the spool, and S one of the transparent windows or slots in the paper.

To operate the device the operator turns the knob 16 till the pointer 20 points to the desired letter on the case 11; this places a similar letter in register with the opening 17. He then presses the push button 27. The spring 38 will permit the pawl tooth 32 to slide over a tooth on the ratchet wheel 33 without actuating it, and the wedge 28 will presently push the strip 29 which, in turn, actuates the shutter 24 so that it is drawn aside permitting light to enter the aperture 17 thus photographically printing the letter on the film. When he releases the push-button the spring 26 swings the shutter 24 to close the aperture again, and the pawl tooth 32, being now in engagement with a tooth on the ratchet wheel, will be pushed up by the coil spring 34, the latter being strong enough to rotate the spool over an arc the length of a tooth on the ratchet wheel. This action moves the film over the exposure frame 10 a distance appropriate for spacing the letters printed on the film, so that the next letter being duly brought into register with the aperture and the operation repeated, it will be printed in the proper successive position on the film.

To obtain a space between words it is necessary that the film shall advance one step, or spacing distance, without a character being printed, and for this purpose the disk 14 carries an opaque spot 52, which when placed in register with the aperture permits the push button to be depressed to advance the film without light being admitted thereto.

It will be seen by reference to Fig. 5 that the letter "S," which illustrates the printing position for letters, has an arrangement whereby, upon printing, the corresponding letter-impression on the impressible sheet or film will stand erect with respect to a longitudinal edge of the sheet, that is to say, the base of the printed letters would be toward the edge. Other letters on the disk 14 would, when placed opposite either of the letter-printing apertures, have a similar arrangement as the letter "S," and the word-formation resulting from the selective printing of letters and the spacing movements of the film or sheet would be lengthwise with the edge, so that the successive letter-impressions stand erect in the usual word-forming manner upon an imaginary line running parallel with the edge.

Whether the printing takes place through the aperture 17 or the aperture 23 the letter-impression made upon the contained sheet is regarded herein as being made upon a portion thereof which is in proximity to a longitudinal edge of the sheet printed upon.

While a shutter, especially an automatic one like 24, is regarded as a valuable help for quick operation in connection with types or patterns of light pervious nature, the device is operable to form words without the presence of a shutter. An operator may, for instance, cover and uncover the aperture with his finger or otherwise shade it, and the opaque spot 52 may, normally, obstruct the passage of light to the film. Also, the word-forming operativeness of the device, even though the shutter be absent, may apply with regard to the use of photographic print paper arranged to occupy the place of the film, as when the camera is employed for enlarging purpose, for which film may, of course, also be used, it being quite feasible to hold the camera so as to turn the aperture toward and away from the light source, or merely adjust each letter and give the light a little time to act. Also, the degree of light perviousness of the patterns may be such as to be suitable in view of the degree of sensitiveness of the photographic material to the light-source, whatever it be. It will also be plain that the film may be impressed with indicia other than words, such as ciphers or letters designating sequential exposures, or even when a letter or cipher is not present or in printing position light may be admitted through the aperture successive times as the film is moved intermittently with the light admission, this enabling an operator to merely spot successive exposures differently, if he so chooses.

In my application for patent on photographic cameras, filed November 25, 1914, Serial No. 873,856 I have shown and described a camera adapted for the photographing of pictorial views and provided with permanent patterns or master-letters whereby an inscription may be applied in relation with the view, and I have also disclosed therein a flexible film-backing or cover shown in a form whereby a suitable cut renders a film portion accessible for receiving an inscription.

Having thus described my invention I claim as new and desire to secure by Letters Patent:

1. The combination with a photographic camera furnished with a light pervious opening and adapted to carry a flexible light sensitive film, of means carrying the alphabet in photographically transferable characters, mounted for movement relatively to the film so as to place a character opposite said opening, a means for controlling the admission of light to part of the film through said opening in order to photographically expose the film to a character thus placed, means for shielding all other parts of the film from light during said exposure, spools to carry and wind said film, means whereby the spools may be rotatably mounted for the movement of the film, and means for determining the accurate adjustments of the film into a series of closely stepped positions.

2. A photographic camera carrying a picture-defining element opposed to the contained sensitized material, movably mounted patterns whereby letter-impressions may be made upon a sheet contained in the camera, the patterns representing the letters constituting the alphabet and being arranged to permit the selective printing of letters onto said sheet, and means enabling an operator to combine the letter-impressions so as to form words upon the sheet, said means comprising means for feeding the sheet successive determinate steps.

3. The combination with a photographic camera furnished with a light pervious opening and an immediate support for a flexible light sensitive film, of means carrying photographically transferable characters, operable for placing any one thereof opposite said light pervious opening, the characters representing the letters which constitute the alphabet, a means for controlling the admission of light to part of the film through said opening, to photographically expose the film to the character thus placed, means for excluding actinic light from all other parts of said film during said exposure, means for moving the film relatively to said support to obtain a space between characters thus photographed thereon, and means for limiting the extent of said movement to make said space an appropriate one.

4. The combination with a photographic camera furnished with a light pervious opening, of means for carrying a roll of flexible light sensitive film, a means carrying the alphabet in photographically transferable characters, movable relatively to the film and operable for placing any one of said characters opposite said opening, a means for controlling the admission of light to photographically expose part of the film to the letter or character thus placed, means for shielding all other parts of the film from light during said exposure, a roll rotating means whereby the film is moved across said light pervious opening, and means for limiting the extent of said rotation in order to obtain an appropriate space between the characters photographed on the film.

5. The combination with a photographic camera furnished with a light pervious opening, the camera being adapted to carry a flexible light sensitive film, of means carrying photographically transferable letters or characters, adapted to be moved so as to place the letters or characters in register with said opening, a means for controlling the admission of light to part of the film through said opening, in order to photographically expose the film to the letter or character thus placed, means for shielding all other parts of the film from light during said exposure, means for carrying and winding said film, and means for moving the film with a step by step movement for the purpose set forth.

6. The combination with a photographic camera furnished with a light pervious opening adjacent to the photographic surface carried by the camera, of means for carrying a roll of flexible light sensitive film, a means carrying photographically transferable letters or characters, movable so as to place any letter or character in register with said opening, a means for controlling the admission of light to part of the film through said opening, in order to photographically expose the film to the letter or character thus placed, means for shielding all other parts of the film from light during said exposure, and a roll rotating means adapted to move said film with a step by step movement to space the letters or characters thus protographed on the film.

7. The combination with a photographic camera adapted to carry a flexible light sensitive film and furnished with a light pervious opening near one of the longitudinal edges of the film, of means carrying photographically transferable letters or characters, adapted to be moved relatively to the film so as to place any letter or character opposite said light pervious opening, a means for controlling the admission of light to part of the film through said opening, in order to photographically expose the film to the letter or character thus placed, means for shielding all other parts of the film from light during said exposure, means for carrying and winding the film, and means adapted or constructed with reference to said letters or characters for adjusting the film appropriately to space their photographic impressions on the film.

8. The combination with a photographic camera adapted to permit the making of character reproductions upon an impressible sheet within the camera, of a member bearing the characters to be reproduced, adjustably mounted on the camera to permit the selective printing of characters, a frame carried opposite the sheet and forming an exposure opening, said frame being adapted and arranged to define the area to bear the pictorial impression, and means for changing the position of said sheet relatively to said frame and said member, including members coöperatively adapted to determine the proper degree of such change for the printing of characters in spaced word-forming relation upon the sheet.

9. A film holder having an exposing aperture and means to hold flexible sensitized film in position within the holder to permit the moving and bending of contained film to place same in layers, said film being thereby mounted for movement in a definite path of travel opposite said aperture, the aperture being adapted and arranged to admit light to the film exclusively along the film edge running parallel with said path of travel, members to exclude actinic light from all other parts of the film while light is being thus admitted along a film edge, patterns representing characters to be photographed on the film, movable relatively to the film and mounted for adjustment opposite said aperture, and a closure whereby the film portion opposed to the aperture may be closed off against light therefrom.

10. The combination with a photographic camera furnished with an aperture for printing letters or characters, the camera having a frame forming an exposure opening and being adapted and arranged to shadowgraphically define the boundary of pictorial views to be photographed on light sensitive film placed opposite thereto, said aperture being located over one corner of said frame, of means for photographically printing indicia on the film through permanent letters or characters adapted to be successively brought into register with said aperture, and means accessible from the exterior of the camera for moving the film relatively to said frame.

11. A photographic camera having means for rotatably carrying in the camera-interior a film roll including a sensitized film and flexible protective cover therefor, a movably mounted member provided with characters adapted to be reproduced on the film, the camera having an aperture opposed to said member to permit the reproduction on the film of said characters by light admitted through the aperture, means for moving film and cover with a step by step movement, and a shutter arranged to be moved opposite said aperture to exclude and admit actinic light to the film.

12. The combination with a photographic camera comprising a casing to inclose a flexible sensitized film, and having an opening to admit light to the film, and means for moving the film relatively to said opening, of patterns representing characters adapted to be impressed on the film by light admitted through the opening, said patterns being mounted for movement into appropriate exposure position therefor, a hand-operable shutter device on said casing, movable relatively to the film to exclude and admit actinic light to the film portion in position for exposure through said opening, and means whereby in the operation of said device the film is caused to move appropriately to present a succeeding film portion for exposure to a character opposed to the opening.

13. The combination with a photographic camera furnished with an aperture for printing characters on the contained sensitized film, the camera having a film-masking frame forming an exposure opening to define on the film the area to bear the pictorial impression, of means for photographically printing indicia on said film through characters adapted to be successively brought into register with said aperture, and means enabling an operator to adjust the film from the exterior of the camera relatively to said frame and said aperture, including auxiliary means adapted to determine the suitable film adjustment whereby characters may be printed on the film in a position selected with reference to the photographic view taken by the camera.

14. A photographic camera having a film-masking frame adapted and arranged to shadowgraphically define the boundary of a pictorial view on sensitized film carried adjacent said frame, a device whereby characters may be printed on the film, including an element carrying the alphabet in characters adapted to be so printed, means for moving the film relatively to said frame, and means to indicate the adjustment of the film relatively to the frame and said device in order that a character may be printed on the film at a selected distance from one of the pictorial bounding edges determined by the frame.

15. The combination with a photographic camera having a film-masking exposure frame, and being adapted to carry a flexible light sensitive film adjacent thereto, of a rotatable means whereby said film is moved over said frame with a free movement, means adapted to move said film over said frame with a step by step movement for the purpose set forth, and means for photographically printing letters or characters on said film.

16. The combination with a photographic camera having an exposure frame 10 and an aperture for printing letters or characters, of means whereby a light sensitive sheet is adjusted relatively to said frame appropriately for its being impressed with photographic views, a movable member carrying photographically transferable letters or characters, so arranged that the letters or characters may be placed opposite said aperture, means for controlling the admission of light to part of said sheet in order to photographically expose the sheet to the letter or character thus placed, means for shielding all other parts of the sheet from light during said exposure, and a step-by-step sheet-moving means operatively adapted to suitably space the letters or characters thus printed on the sheet.

17. The combination with a photographic camera furnished with an aperture for printing letters or characters, the camera having an exposure frame and being adapted to carry a flexible light sensitive sheet adjacent thereto, of a means carrying letters or characters and operable for placing them in register with said aperture, a means for controlling the admission of light to part of the film through said aperture, in order to photographically expose the film to the letter or character thus placed, means for shielding all other parts of the film from light during said exposure, rollers to carry and wind said film, means for rotating one of said rollers to move the film over said exposure frame to place it appropriately for being impressed with a series of photographic views, and additional means to move the film over said frame appropriately for spacing the letters or characters photographed through said aperture.

18. A film roll camera comprising members forming an inclosure for the contained strip of sensitized film to exclude actinic light from portions thereof, the camera having in the interior a frame masking a portion of the film, the frame forming an opening to admit light for view exposure, the camera having a light passage arranged to admit light to a sensitized film portion which is in proximity to a longitudinal edge of said strip, all being so adapted and arranged that light may be admitted to said portion through the passage while actinic light is excluded from the larger part of the film area opposed to said opening, a character-bearing element provided with the alphabet in letters adapted to be light-printed on the film by exposure through said passage, said element being mounted for movement relatively to the film and adjustably adapted to permit the placing of the letters in position for said exposure, and carrying them so that a letter thus placed in position shall have the arrangement whereby, upon exposure, the letter-impression on the film will stand erect with respect to a longitudinal edge of said strip, means whereby a film roll may be rotatably mounted to advance the film in a direction parallel with said edge, and means to enable an operator to accurately adjust the film in a series of predetermined successive positions.

19. The combination with a photographic camera having an exposure frame 10 and two light pervious apertures opposite the light sensitive sheet carried by the camera, the one of said apertures being located over the area formed by the inner sides or edges of said frame, the other one of said apertures being located exterior to said area, of means for photographically printing a word or words upon said sheet through either of said apertures, including letters or characters adapted to be brought into register therewith.

20. The combination with a photographic camera furnished with a light pervious opening, the camera being adapted to carry a flexible light sensitive film, of means for carrying spools or rollers to wind said film, means for printing on the film letters or characters through said opening by photographic exposure, and a movable means having a rotary step by step movement, so adapted that one of said spools or rollers may readily be attached thereto, to rotate therewith.

21. A camera adapted to admit light to its contained sensitized sheet and having a frame forming an opening through which the photographic pictorial exposure is made, said frame being arranged to mask a portion of the sheet during said exposure, the camera carrying patterns representing the letters which constitute the alphabet, said patterns being movably mounted with respect to the sheet so as to permit the reproduction thereon of the letters represented by the patterns, mechanism for moving the film in a definite path of travel relatively to said frame from the exterior of the camera, including a hand-operable element extending through a camera wall, means to intermittently restrain the movement of the sheet as it is being moved along in said path of travel, and members to shield from light, while a letter is being reproduced, the larger part of the sensitized area opposed to said opening.

22. The combination with a film holder having an opening to admit light to a contained sensitized film and being adapted to hold said film in position for movement within the holder, of a flexible backing mounted for movement in unison with the film, patterns representing the letters which constitute the alphabet, movably mounted for adjustment opposite said opening to permit the printing of letters therewith on the film, and visual indicating means adapted to enable an operator, as he moves the film and backing, to move them accurate steps bearing predetermined relation to the size of one or more of said patterns, said means comprising indicia and a pointing element in coöperative relation, one thereof being in movable relation with film and cover.

23. In a film roll or cartridge camera adapted to permit the making of character reproductions upon the contained film, the combination with the film cartridge comprising the sensitized film and a superposed flexible protective cover therefor, of a member movably mounted on the camera and bearing the characters to be reproduced, the characters representing the letters which constitute the alphabet, said member, said cover, and said film being relatively so arranged that the film is accessible for the reproduction of characters thereupon while the cover extends over the film to shield portions thereof against light, and means enabling the operator to accurately space the character reproductions on the film so as to effect a word-forming combination of characters, said means being operable to determine accurate successive adjustments of film and cover.

24. In combination, a photographic camera embodying a casing to inclose a strip of sensitized film, a flexible film-covering sheet having a cut whereby an elongated fractional film area extending parallel with and in proximity to a longitudinal edge of said strip is made accessible for the application of indicia, there being in the camera an aperture to one side whereby said area is opposable to the aperture, patterns representing letters or characters, movable opposite said area, an exposure frame 10 having one of its inner sides or edges parallel with the length of this elongated area of the film, and rotary means for moving film and sheet so as to pass said area longitudinally over said frame.

25. The combination with a camera casing having means to rotatably mount a spool to move and wind a contained flexible sensitized photographic sheet upon rotation of the spool, including a rotary member arranged on the exterior of the casing, of a spool to wind said sheet, a movable member adapted to serve as the rear wall of said casing and to extend over said sheet, said member being provided with an opening whereby light may be admitted to the sheet for the production of indicia thereupon, a shutter movable opposite said opening, a flexible protective sheet adapted to be wound upon said spool and to overlie the photographic sheet when in position in the casing, one of said sheets having a series of designations to enable the adjusting of the sheets within the casing as they are moved through the rotation of the spool, said protective sheet having a series of perforations suited to give access to the photographic sheet for the said production of indicia, said casing having a window arranged to permit sight of said designations as the sheets are moved before the window, all being so adapted and arranged that when one of said designations is opposite the window in the casing one of said perforations is in position opposite said opening and a sensitized portion of the photographic sheet.

26. The combination with a photographic camera adapted to carry a flexible light sensitive film, the camera being furnished with an exposing aperture, of means for printing letters or characters on said film by photographic exposure through said aperture, a rotatably mounted roller engaging said film and whereby the film may be moved opposite said aperture, a means connected with said roller and adapted to be engaged for rotating same, and a means to engage said last-mentioned means and operatively adapted to determine the extent of rotation of said roller, whereby the film is moved the appropriate distance for spacing letters or characters photographed on the film.

27. The combination with a photographic camera adapted to carry a flexible light sensitive film, the camera being furnished with a light pervious opening, of means for printing letters or characters on said film by photographic exposure through said opening, means rotatably mounted for winding the film and for moving it opposite the opening, a wheel connected to rotate with said film-winding and moving means and having formations whereby the wheel may be engaged in order to be rotated, and a means engaging said formations whereby the wheel is actuated with a rotary step by step movement for the purpose set forth.

28. The combination with a photographic camera adapted to carry a flexible light sensitive film and furnished with an opening to admit light to the film, of material mounted for movement opposite said opening and having characters adapted to be light-printed on the film by light admitted through the opening, a rotatably mounted roller to move and wind said film, a disk mounted for concentric rotation with said roller and having formations adapted to be engaged by a pawl, a movable pawl to engage same and whereby the roller may be rotated with a step by step movement.

29. The combination with a photographic camera having a film-masking frame forming an opening to expose a limited sensitized film area to light for a pictorial impression, of a flexible sheet superposed on the film, means whereby film and sheet are arranged for movement in unison, said sheet being furnished with indicia indicating divisions of said film area, the camera having means to permit sight of said indicia, and an opening to admit light for the printing of letters on the film; patterns representing the letters to be printed, the letters being those which constitute the alphabet, mounted for adjustment with respect to the last-mentioned opening independently of film and sheet.

30. In a film roll camera adapted to permit the making of character reproductions upon the contained film, the combination with a movably mounted film roll or cartridge therein, comprising spool, film and protective cover, of material bearing the characters to be reproduced, the characters representing the letters which constitute the alphabet, said material being appropriately carried on the camera to permit the successive adjustment of characters into position for reproduction upon a given film portion, and means for adjusting a cartridge member in given relation to the size of a character on said material.

31. The combination with a photographic camera having a device whereby an operator may cause character reproductions upon a sheet in the camera interior, including a member bearing the characters to be reproduced, of means for holding a flexible sensitized sheet and a flexible protective sheet therefor in position for movement within the camera, and means for moving both said sheets with a step by step movement.

32. The combination with a photographic camera adapted to carry a flexible light sensitive film and furnished with an exposing aperture adjacent thereto, of means for carrying and winding said film, a film-masking exposure frame supporting part of the film, a means mounted on the camera for movement relatively to the film and carrying letters or characters, operable so as place the letters or characters opposite said aperture, a shutter device for controlling the admission of light through the aperture, said shutter device and said aperture being so adapted that light is admitted to print only a letter or character at each actuation of the shutter device, and means operating to space into word formation the printed letters or characters by sliding the film an appropriate distance over its immediate support adjacent to said aperture.

33. The combination with a photographic camera having an exposure frame 10 and being adapted to carry a flexible light sensitive film adjacent thereto, of a movable means carrying photographic transferable letters or characters, a light controlling means whereby light is admitted to the film to print thereon only a single letter or character at one time, means to carry and wind said film, means for moving the film over said frame appropriately for spacing the printed letters or characters in order to form them into words, said light controlling means being so adapted that words may be printed selectively along lines one above the other.

34. The combination with a film holder provided with an opening to admit light for the photographing of pictorial views on light sensitive film movably mounted therein, of a character-bearing device operable to impress the film by means of its characters independently of light admitted through said opening, the characters representing the letters which constitute the alphabet, and means for determining the proper steps of film movement for the composition of character-impressions on the film.

35. A photographic camera comprising members whereby a contained sensitized film is inclosed so as to normally exclude actinic light therefrom, a frame to mask a portion of the film, said frame forming the opening through which the photographic pictorial exposure is made, the camera being adapted to permit the making of character reproductions upon a film portion eccentrically located with respect to said opening, and having film-winding means operable for moving the film with a free movement relatively to said opening, a step-by-step moving mechanism for actuating the film, and a member mounted for movement opposite said last-mentioned portion of the film and bearing the characters to be reproduced thereon.

36. The combination with a photographic camera furnished with a light pervious opening, the camera being adapted to carry a flexible light sensitive film, of a means carrying letters or characters, operable for placing the letters or characters in register with said opening, a detent for obtaining a definite adjustment of the letters or characters relatively to the opening, a shutter device for controlling the admission of light to expose part of said film to the letter or character registering with the opening, means for shielding all other parts of said film from light during said exposure, spools or rollers to carry and wind said film, and means for rotating one of said spools or rollers, operatively adapted to space the letters or characters thus photographed on the film.

37. The combination with a film holder having spool chambers at opposite ends and therebetween an opening to admit light to a contained strip of sensitized film, the holder having also a light passage arranged to pass light to a film portion in proximity to one of the longitudinal edges of said strip, of a character-bearing element mounted on the camera for movement relatively to the film so as to permit the placing of a character in such position opposite the passage that upon exposure the character-impression will stand erect with respect to a longitudinal edge of the film, the characters being adapted to be light-printed on the film and comprising the letters which constitute the alphabet, a spool adapted for insertion in the camera to move and wind the film upon rotation, members to rotatably mount said spool within one of said spool chambers, and members arranged to exclude actinic light from the larger part of the film area opposed to said opening while light is passing to the film through said passage.

38. The combination with a photographic camera adapted to permit the making of character reproductions upon a contained impressible sheet and having a rotatable element arranged to engage said sheet and move it upon rotation, of a member bearing the characters to be reproduced, and a stopping member operatively associated with the rotatable element to cause the stop of its rotation.

39. The combination with a holder for sensitized photographic material, said holder having a device for printing characters upon a sheet within the holder, of a support for a flexible sensitized sheet and flexible protective sheet therefor whereby one of the sheets is held in position for being printed upon by means of said device, said support forming an exposure opening adjacent the sensitized sheet, means operatively adapted for simultaneously sliding both said sheets relatively to said support, and a member arranged to cause the stop of the sliding movement.

40. The combination with a film roll camera having an opening to admit light to its film, and a film-winding device including a hand-operable member arranged on the exterior of the camera to rotate the film roll in the interior, of a supplemental reciprocally movable member coöperatively associated with the movement of said device for advancing the film within the camera, patterns representing the letters which constitute the alphabet, appropriately mounted to permit the placing of a pattern in position for its reproduction on the film by light admitted through said opening, and a shutter movable opposite the opening to exclude and admit actinic light to the film portion in position for exposure therethrough.

41. The combination with a film roll camera having a rotary film-winding device and being adapted to admit light to the film and having a character-bearing element mounted for movement relatively to the film, of a disk arranged to rotate with said device, a member to engage said disk, the disk and the member being coöperatively adapted to determine a definite extent of rotation of said device in a proportion suitable, for the purpose stated, to the size of the characters on said element.

42. The combination with a photographic camera adapted to permit the making of character reproductions upon a contained sensitized film and having a rotatable film-winding device adapted to be engaged for rotation, of a member bearing the characters to be reproduced on the film, a push-button resiliently mounted on the camera, and connection between said film-winding device and said push-button whereby upon the pressing of the latter the former is caused to rotate.

43. The combination with a film roll camera adapted to carry a flexible light sensitive film supported on spools or rollers therein for movement past the opening through which the photographic pictorial exposure is made, and having a film-masking frame forming said exposure opening, and a device for printing characters on the film, of a rotary step-by-step moving mechanism arranged to permit the ready connection of a spool or roller thereto, to rotate therewith.

44. The combination with a film roll camera having a rotary device for winding a contained sensitized film, the camera being adapted to permit the making of character reproductions upon the film and carrying a member bearing the characters to be reproduced, of a ratchet-wheel and pawl operatively associated and arranged to rotate said device.

45. The combination with a film camera furnished with a passage to admit light to the contained sensitized film, and having a film-winding device operable for moving the film in the interior, of a member having photographically transferable characters, appropriately mounted to permit the placing of a character in position for its reproduction on the film by light admitted through the passage, a shutter device operable to admit light to the film portion in position for exposure through said passage, said shutter device being coöperatively connected with said film-winding device so that upon movement of one of them the other is caused to actuate.

46. A camera having a light passage arranged to admit light to the sensitized film carried in the interior, a member having a set of characters adapted to be light-printed on the film, appropriately mounted to permit the placing of a character in position for its reproduction on the film by light admitted through said passage, the characters on said member being those which constitute the alphabet, another member, this member having a guide scale of characters for the adjustment of each letter in said set relatively to the passage, the guide scale characters being also those which constitute the alphabet, and a pointer movable relatively to said scale to successively indicate the guide characters, the pointer being in movable relation with said first-mentioned member.

47. A photographic camera having a light passage to admit light to the sensitized film in the interior, a character-bearing element having a set of characters adapted to be light-printed on the film, mounted for adjustment with respect to the passage, the characters being those which constitute the alphabet, a guide scale of characters appropriately carried for sight, said guide scale characters being also those which constitute the alphabet, said element being movable relatively to the guide scale, a pointer adapted to be moved together with said element and point successively to the characters on said scale as the pointer is actuated during the movement of said element, and a detent device associated with the character-bearing element to determine successive accurate adjustment thereof.

48. In combination, a photographic camera comprising a casing to inclose photograpic material as a protection against light and adapted to hold in the interior a flexible sensitized sheet and superposed flexible protective sheet and to permit the making of character reproductions upon one of said sheets, a frame carried in the interior of said casing and forming an exposure opening whereby light may be admitted to the sensitized sheet from the front of the camera, a spool for moving and winding both said sheets, means to rotatably mount the spool so that upon rotation of the spool the sheets will slide over said frame, an element bearing the characters to be reproduced, the characters being those which constitute the alphabet, said element being mounted on the camera to permit the adjustment of characters relatively to both sheets into position for reproduction, all being so adapted and arranged that a character selectively so placed shall have a printing position bearing definite relation to one of the sides of said frame or the linear extension of said side, and that a character when so placed in position shall have the arrangement whereby, upon printing, the character-impression will stand erect with respect to a longitudinal edge of the sheet printed upon, said means whereby the spool may be rotatably mounted including a rotatable member operable from the exterior of the closed casing to rotate the spool.

49. In combination, a photographic camera comprising members forming an inclosure for a contained strip of sensitized film to exclude actinic light from portions thereof, a film-masking frame carried opposite the film and forming an opening to admit light thereto for view exposure, the camera having a light passage arranged to admit light to a sensitized portion of the film, all being so adapted and arranged that light may be admitted to this portion through the passage while actinic light is excluded from the larger part of the film area opposed to said opening, a shutter device movably carried by the camera to exclude and admit actinic light to a film portion exposable through the passage, a character-bearing element provided with the alphabet in letters adapted to be light-printed on the film by exposure through the passage, said element being mounted on the camera for movement relatively to the film and adjustably adapted to permit the placing of the letters in position for said exposure, and carrying them so that a letter thus placed in position shall have the arrangement whereby, upon exposure, the letter-impression will stand erect with respect to a longitudinal edge of said strip of film, a film-winding device comprising a roller rotatably mounted in the interior of the camera for advancing said strip of film in a direction parallel with its said edge, a member mounted for rotation with said roller, a member adapted to engage said other member, these two members being coöperatively adapted to determine a definite extent of each succesive partial rotation of said roller, and a hand-operable member accessible from the exterior of the closed camera and whereby the roller may be rotated in the interior.

50. A camera comprising a casing to inclose photographic material as a protection against light and being adapted to admit light to portions of a contained sensitized sheet, a flexible protective sheet superposed on the sensitized sheet, a frame masking a portion of the sensitized sheet and forming an opening to admit light thereto for pictorial impression, a rotatably mounted roller to wind said sheets and operable to move them over said frame in a direction parallel with the longitudinal edges of the sheets, a member mounted for rotation together with said roller and having formations adapted to be engaged by a pawl, a movable pawl to engage same and whereby the roller may be rotated with a step by step movement, a character-bearing element carrying the alphabet in letters enabling an operator to cause letter-impressions therewith upon one of said sheets, so adapted that a character may be placed in position for character-impressions along a longitudinal edge of the sheet printed upon, and that a character so placed in position shall have the arrangement whereby, upon printing, the character-impression will stand erect with respect to said edge.

51. In combination, a camera comprising members forming an inclosure for a contained strip of sensitized film to exclude actinic light from portions thereof, and having a frame masking a portion of the film, said frame forming an opening opposite the film to admit light thereto for view exposure, the camera having a light passage arranged to admit light to a sensitized film portion which is in proximity to a longitudinal edge of said strip, all being so adapted and arranged that light may be admitted to said last-mentioned portion through the passage while actinic light is excluded from the larger part of the film area opposed to said opening, material carried by the camera and provided with the alphabet in letters adapted to be light-printed on the film by exposure through said passage, said material being adjustably mounted for movement relatively to the film and for placing the letters in position for said exposure, and carrying them so that a letter thus placed in position shall have an arrangement whereby, upon exposure, the letter-impression will stand erect with respect to a longitudinal edge of said strip of film, a film-winding device comprising a roller rotatably mounted in the camera interior for advancing said strip of film in a direction parallel with its said edge, an element having formations adapted to be engaged by a pawl, an element consisting in a pawl mounted for coöperation with said formations, one of said elements being mounted for rotation together with the roller, these elements serving as means for rotating the roller with a step by step movement.

52. A camera comprising members forming an inclosure for a contained strip of sensitized film to exclude actinic light from portions thereof, the camera having a frame masking a portion of the film and forming an opening to admit light to the film for view exposure, the camera having a light passage arranged to admit light to a sensitized film portion which is in proximity to a longitudinal edge of said strip, all being so adapted and arranged that light may be admitted to this portion through the passage while actinic light is excluded from the larger part of the film area opposed to said opening, a shutter movably arranged to admit actinic light to a film portion in position for exposure through the passage, a character-bearing element provided with the alphabet in letters adapted to be light-printed on the film by exposure through the passage, said element being movable relatively to the film and adjustably mounted for placing the letters in position for such exposure, and carrying them so that a letter thus placed in position shall have the arrangement whereby, upon exposure, the letter-impression will stand erect with respect to a longitudinal edge of said strip of film, detent means coöperatively associated with said element to determine successive accurate adjustments thereof, a film-winding device rotatably mounted for advancing said strip of film in a direction parallel with its said edge, an element having formations adapted to be engaged by a pawl, another element consisting in a pawl mounted for coöperation with said formations, one of these two elements being mounted for rotation together with said film-winding device, these elements serving as means for rotating said device with a step by step movement.

53. A camera comprising members forming an inclosure for a contained strip of sensitized film to exclude actinic light from portions thereof, the camera having a frame masking a portion of the film and forming an opening to admit light to the film for view exposure, the camera having a light passage arranged to admit light to a sensitized portion of the film, all being so adapted and arranged that light may be admitted to this portion through the passage while actinic light is excluded from the larger part of the film area opposed to said opening, a shutter movable to expose a film portion to light through the passage, a character-bearing element provided with the alphabet in letters adapted to be light-printed on the film by exposure through the passage, said element being movable relatively to the film and adjustably mounted for placing the letters in position for such exposure, and carrying them so that a letter thus placed in position shall have the arrangement whereby, upon exposure, the letter-impression will stand erect with respect to a longitudinal edge of said strip of film, the camera having a guide scale of characters appropriately carried for sight and arranged to serve as a guide for the successive adjustments of characters on said element into said position, the guide characters being also those which constitute the alphabet, detent means adapted to co-act with said element as an additional guide to make each of said adjustments an accurate one, a film-winding device comprising a roller rotatably mounted in the interior for advancing said strip of film in a direction parallel with the said longitudinal edge thereof, a member mounted for rotation with the roller, a member adapted to engage said other member, these two members being cooperatively adapted to determine a definite extent of each successive partial rotation of said roller, and a hand-operable member accessible from the exterior of the camera for rotating the roller.

54. A camera comprising members forming an inclosure for a contained strip of sensitized film to exclude actinic light from portions thereof, the camera having a frame masking a portion of the film and forming an opening to admit light to the film for view exposure, the camera having a light passage arranged to admit light to a sensitized film portion which is in proximity to a longitudinal edge of said strip, all being so adapted and arranged that light may be admitted to said portion through the passage while actinic light is excluded from the larger part of the film area opposed to said opening, a shutter movable to expose a film portion to light through the passage, a character-bearing element provided with the alphabet in letters adapted to be light-printed on the film by exposure through said passage, said element being movable relatively to the film and adjustably mounted for placing the letters in position for such exposure, and carrying them so that a letter thus placed in position shall have the arrangement whereby, upon exposure, the letter-impression will stand erect with respect to a longitudinal edge of said strip of film, the camera having a guide scale of characters appropriately carried for sight, said guide scale characters being also those which constitute the alphabet, said element being movable independently of said guide scale, a pointer adapted to be moved together with said element and point successively to the guide scale characters during the movement of said element, a film-winding device rotatably mounted for advancing said strip of film in a direction parallel with its said edge, an element having formations adapted to be engaged by a pawl, another element consisting in a pawl mounted for coöperation with said formations, one of these two elements being mounted for rotation together with said film-winding device, these two elements serving as means for rotating said device with a step by step movement.

EINAR LESCHBRANDT.

Witnesses:
Charles A. Rutter,
I. D. Stroup.